(12) United States Patent
Crawley

(10) Patent No.: US 9,868,004 B1
(45) Date of Patent: Jan. 16, 2018

(54) FIRE HOSE AND PUMP SYSTEM

(71) Applicant: Christopher Crawley, Worcester, MA (US)

(72) Inventor: Christopher Crawley, Worcester, MA (US)

( * ) Notice: Subject to any disclaimer, the term of this patent is extended or adjusted under 35 U.S.C. 154(b) by 77 days.

(21) Appl. No.: 15/051,759

(22) Filed: Feb. 24, 2016

(51) Int. Cl.
*A62C 35/20* (2006.01)
*F16L 55/07* (2006.01)

(52) U.S. Cl.
CPC .............. *A62C 35/20* (2013.01); *F16L 55/07* (2013.01)

(58) Field of Classification Search
CPC .................................. A62C 35/20; F16L 55/07
See application file for complete search history.

(56) References Cited

U.S. PATENT DOCUMENTS

| | | | |
|---|---|---|---|
| 3,544,235 A | 12/1970 | Smith | |
| 4,492,525 A | 1/1985 | Bilyeu | |
| 4,650,003 A * | 3/1987 | Euson | B05B 5/08 169/60 |
| 5,419,497 A | 5/1995 | Warrington | |
| 5,888,051 A | 3/1999 | McLoughlin | |
| 6,113,004 A * | 9/2000 | Steingass | A62C 5/02 169/30 |
| 6,257,750 B1 * | 7/2001 | Strasser | A62B 3/00 362/234 |
| 6,651,900 B1 * | 11/2003 | Yoshida | A62C 25/00 169/13 |
| 6,889,912 B2 | 5/2005 | Clum | |
| 7,007,761 B1 * | 3/2006 | Johnson, IV | A62C 27/00 169/24 |
| 7,137,456 B2 * | 11/2006 | Moses | A62C 31/22 169/24 |
| D618,707 S | 6/2010 | Schuetz | |
| 2003/0047327 A1 * | 3/2003 | Gilbert | A62C 5/02 169/46 |
| 2004/0200536 A1 * | 10/2004 | Strasser | A62C 33/00 138/104 |
| 2005/0077057 A1 * | 4/2005 | Laskaris | F04D 29/669 169/52 |
| 2006/0180321 A1 * | 8/2006 | Yoshida | A62C 31/02 169/13 |
| 2009/0038809 A1 * | 2/2009 | Sundholm | A62C 35/60 169/34 |
| 2009/0078434 A1 * | 3/2009 | Archambault | B64D 1/18 169/53 |
| 2010/0186971 A1 * | 7/2010 | Seyffert | A62C 31/22 169/13 |
| 2010/0246331 A1 * | 9/2010 | Paul | F16L 11/086 367/173 |

FOREIGN PATENT DOCUMENTS

CN 203043381 U 7/2013

* cited by examiner

*Primary Examiner* — Arthur O Hall
*Assistant Examiner* — Steven M Cernoch

(57) ABSTRACT

The fire hose and pump system is a fully duplex water management system adapted for use in firefighting. The fire hose and pump system pumps and delivers water during firefighting operations. The pump is reversible and can be used to remove water from the scene after firefighting operations have terminated. The fire hose and pump system further comprises a communication extender for improving communication reliability in a hazardous situation and an emergency lighting capability for low light situations. The fire hose and pump system comprises a modified hose, a pump system, and an electronic system.

10 Claims, 4 Drawing Sheets

FIRE HOSE AND PUMP SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lifesaving and firefighting equipment, more specifically, a full duplex hose and pump system.

SUMMARY OF INVENTION

The fire hose and pump system is a fully duplex water management system adapted for use in firefighting. The fire hose and pump system pumps and delivers water during firefighting operations. The pump is reversible and can be used to remove water from the scene after firefighting operations have terminated. The fire hose and pump system further comprises a communication extender for improving communication reliability in a hazardous situation and an emergency lighting capability for low light situations.

These together with additional objects, features and advantages of the fire hose and pump system will be readily apparent to those of ordinary skill in the art upon reading the following detailed description of the presently preferred, but nonetheless illustrative, embodiments when taken in conjunction with the accompanying drawings.

In this respect, before explaining the current embodiments of the fire hose and pump system in detail, it is to be understood that the fire hose and pump system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fire hose and pump system.

It is therefore important that the claims be regarded as including such equivalent construction insofar as they do not depart from the spirit and scope of the fire hose and pump system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
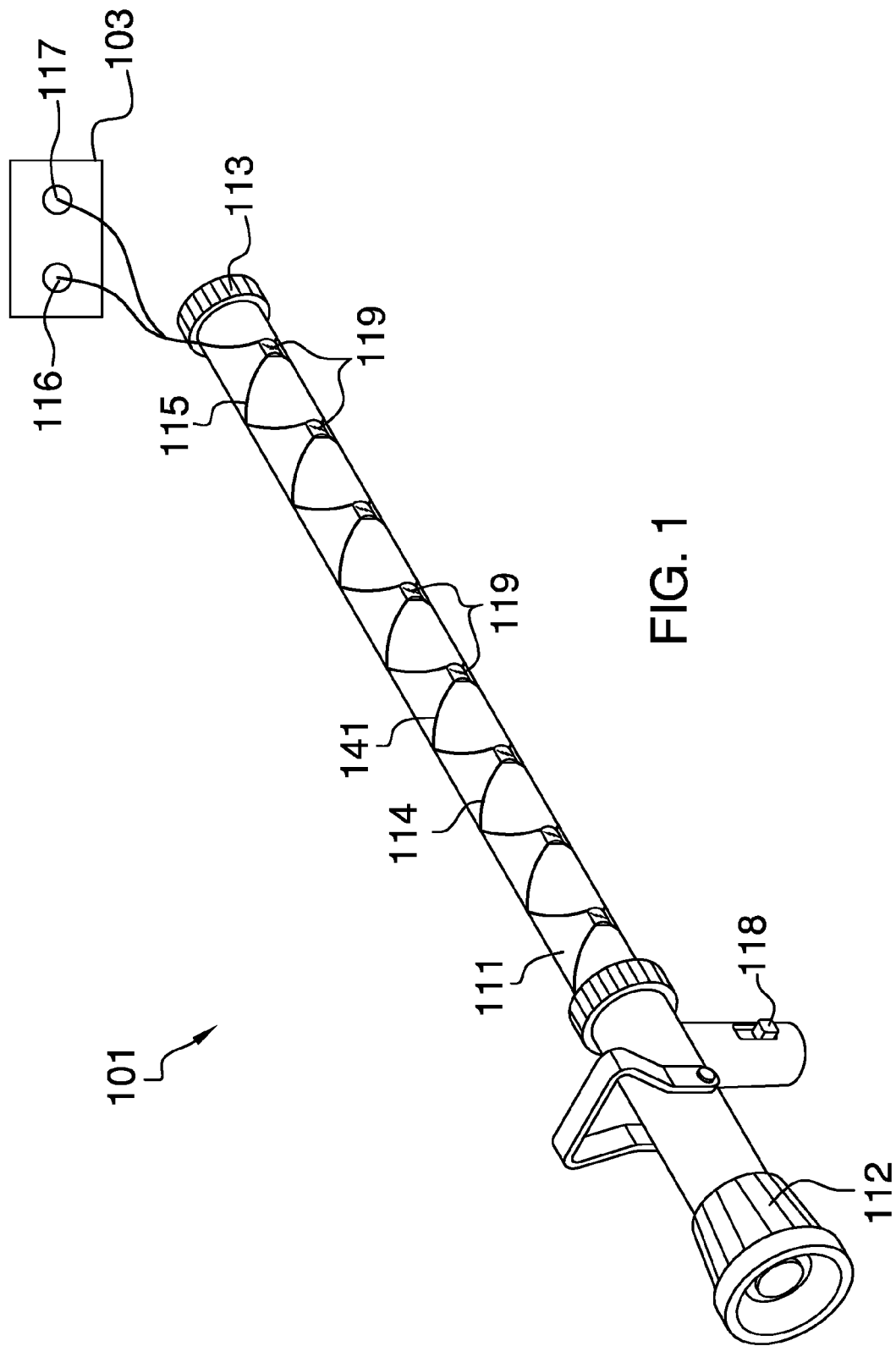
FIG. 1 is a perspective view of an embodiment of the disclosure.
Figure 2:
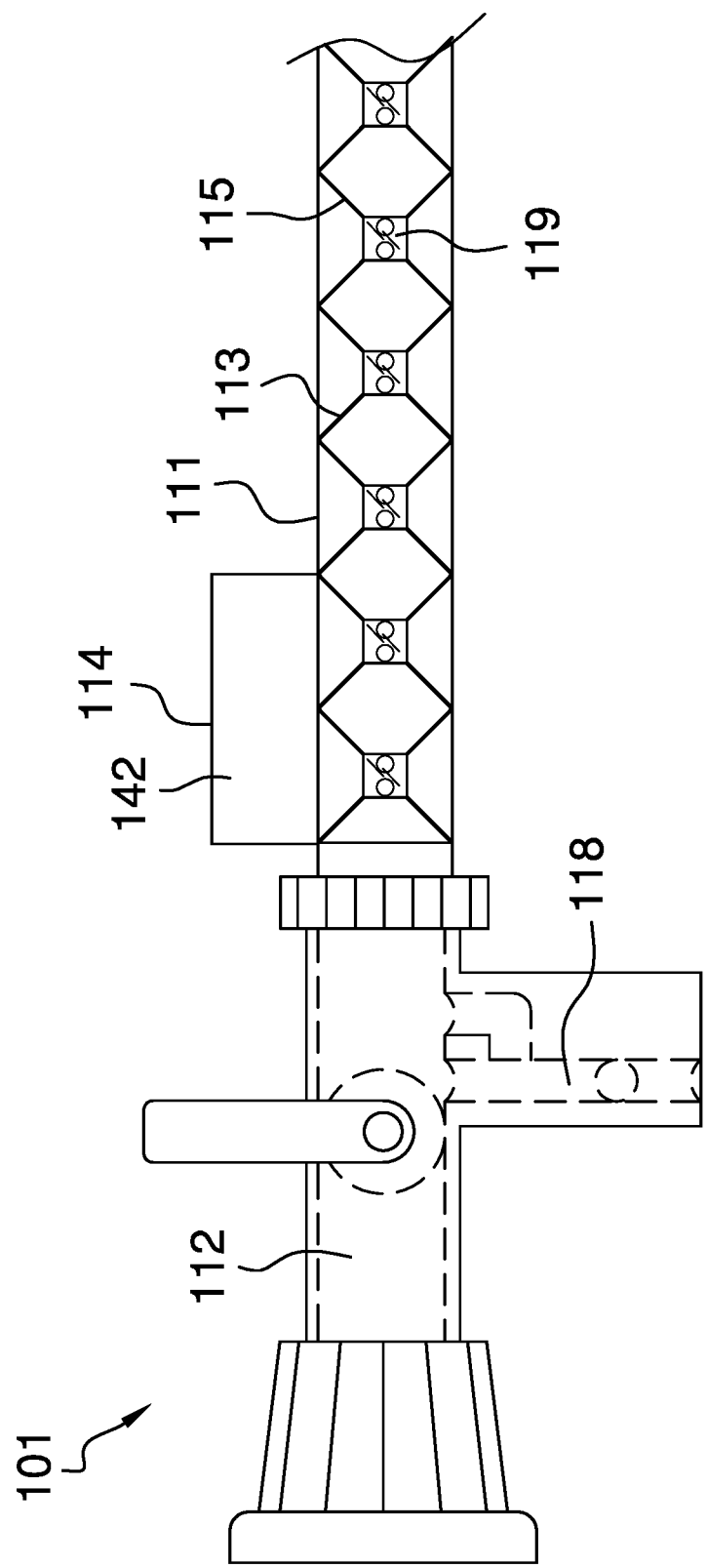
FIG. 2 is a front view of an embodiment of the disclosure.
Figure 3:
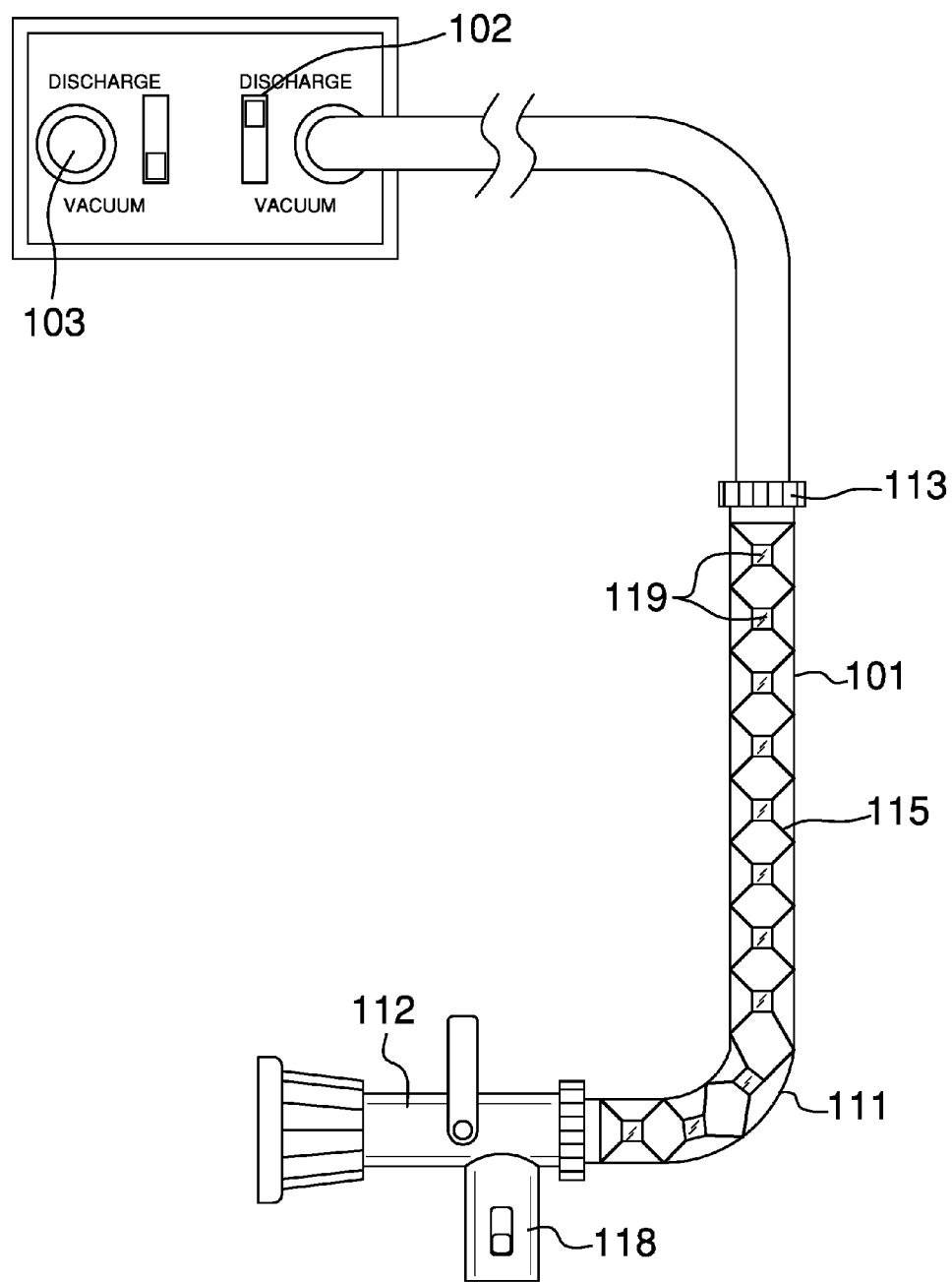
FIG. 3 is an in use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a plurality of potential embodiments of the disclosure, which are illustrated in FIGS. 1 through 4.

The fire hose and pump system 100 (hereinafter invention) comprises a modified hose 101, a pump system 102, and an electronics system 103. The invention 100 is a fully duplex water management system adapted for use in firefighting. The invention 100 pumps and delivers water during firefighting operations. The pump system 102 is reversible and can be used to remove water from the scene after firefighting operations have terminated. The invention 100 further comprises a communication extender 114 for improving communication reliability in a hazardous situation and an emergency lighting capability for low light situations.

The modified hose 101 further comprises a hose 111, a nozzle 112, a connecting joint 113, a communication extender 114, a light net 115, a communication interface 116, and an external power source 117. The hose 111 is a commercially available fire hose that is fitted with a nozzle 112 and a connecting joint 113. The nozzle 112 is a conical spout that is mounted on the end of the hose 111 to control the flow of water through the hose 111. The nozzle 112 further comprises a nozzle valve 118 that is used to control water flow through the nozzle 112. The connecting joint 113 is a NFPA 1963 fire hose coupling that is used to connect the hose 111 to the pump system 102.

The communication extender 114 is an electrical device that is used to improve radio communications within the area of the firefighting operations. In the first potential embodiment of the disclosure, the communication extender 114 is a plurality of wires 141 that form a plurality of antennas that are connected to the area communication system and that are used to extend the range of antenna coverage into the spaces occupied by the modified hose 101. Methods to connect antennas to communication systems are well known and documented in the art. In the second potential embodiment of the disclosure, the communication extender 114 is a commercially available two way radio repeater 142 that is attached to the modified hose 101. The function of the repeater is to amplify and rebroadcast radio communication broadcasts received on the operating frequency or frequencies used during the firefighting operations. The light net 115 is a mesh with electrical devices attached that is attached to the modified hose 101. The light net 115 further comprises a plurality of LEDs 119. The light net 115 is connected to an external power source 117 that is used to illuminate the plurality of LEDs 119 during firefighting operations. The purpose of illuminating the modified hose 101 during firefighting operations is to light an emergency exit path for those in need to follow to either end of the modified hose 101 where trained assistance will be available.

Figure 4:
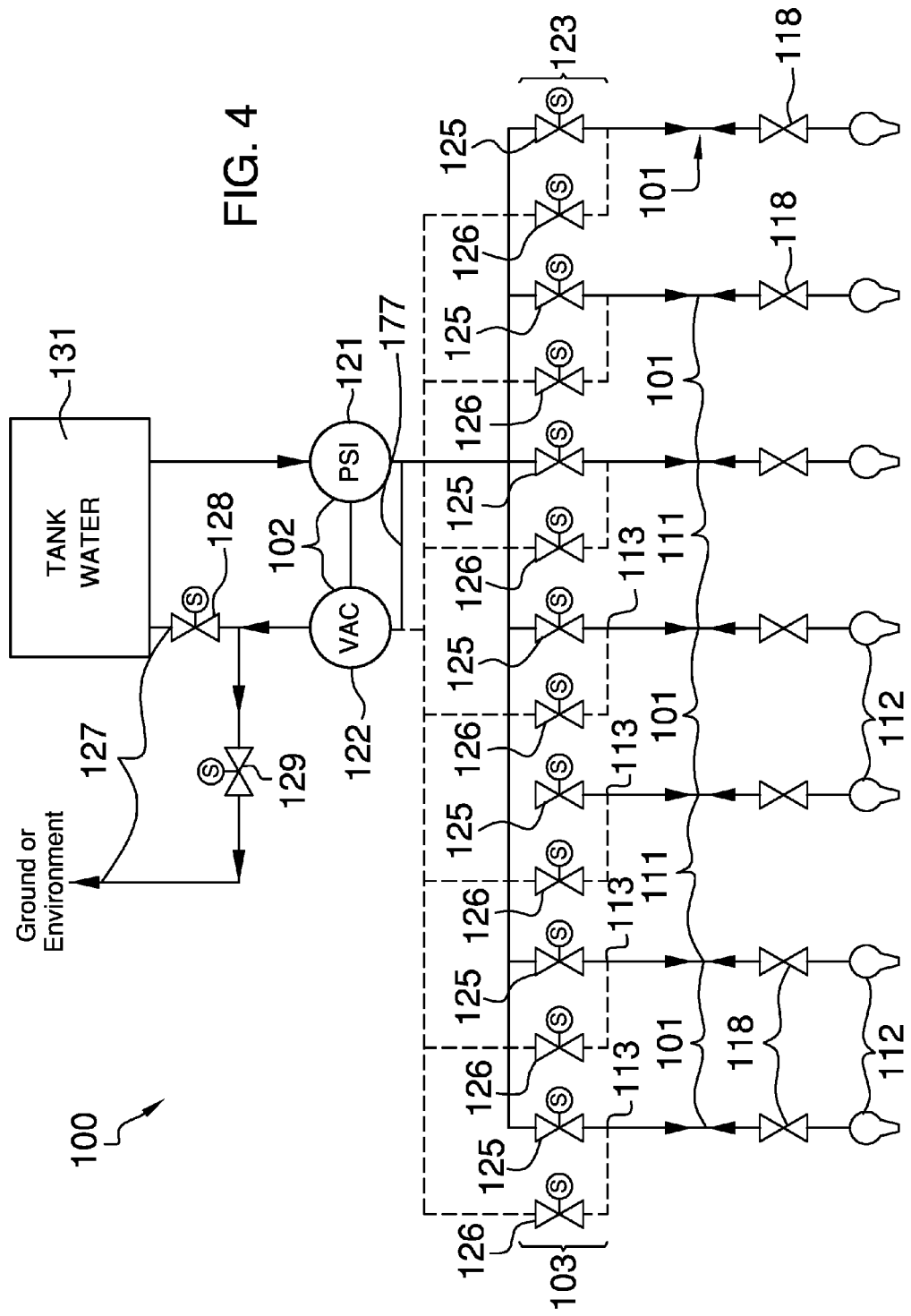
FIG. 4 is a block diagram of an embodiment of the disclosure.

As shown in FIG. 4, the pump system 102 is designed to support one or more modified hoses 101. The pump system 102 pumps water through each of the modified hoses 101 in support of firefighting operations. After firefighting operations have been terminated, the flow through the pump system 102 is reversed creating a vacuum system that can be used to clean up the areas affected by the firefighting operations. The pump system 102 further comprises a pressure pump 121, a vacuum pump 122, and a plurality of valves. The pressure pump 121 is a commercially available pump that is used to pump water from a water reservoir 131 through the modified hose 101 for use in firefighting operations. The vacuum pump 122 is a commercially available pump that uses the modified hose 101 to remove water from the area of firefighting operations. The vacuum pump 122 is adapted to transport the removed water to a designated water discharge point 127 which may be storage unit or a direct release of the removed water into the environment.

As shown in FIG. 4, the plurality of valves 123 are used to control the flow of water through the invention 100. The plurality of valves 123 further comprises a plurality of pump valves 125, a plurality of vacuum valves 126 and the nozzle valve 118 associated with each of the one or more modified hoses 101. The nozzle valve 118 is discussed elsewhere in this disclosure. Each of the plurality of pump valves 125 is a valve located near the pressure pump 121 that is used to initiate and discontinue the flow of water from the pressure pump 121 into a modified hose 101 selected from the one or more modified hoses 101 used by the invention 100. Each of the plurality of vacuum valves 126 is a valve located near the vacuum pump 122 that is used to initiate and discontinue the flow of water through a modified hose 101 selected from the one or more modified hoses 101 used by the invention 100 and the vacuum pump 122 from the area of firefighting operations to the designated water discharge point 127. In a third potential embodiment of the disclosure, each of the plurality of pump valves 125 and each of the plurality of vacuum valves 126 is a two-port solenoid valve.

As shown in FIG. 4, in the third potential embodiment of the disclosure, the designated water discharge point 127 is managed using a storage discharge solenoid valve 128 and an environment discharge solenoid valve 129.

The electronics system 103 comprises the communication interface 116 between the area communication system and the external power source 117 used to power the light net 115. The communication interface 116 and the light net's 115 use of the external power source 117 are discussed elsewhere in this disclosure.

In firefighting operation, the pressure pump 121 pumps water from the water reservoir 131 to each of the one or more modified hoses 101. Water pumped through the pressure pump 121 flows to designated modified hoses 101 to support firefighting operations. A modified hose 101 is designated by opening the valve selected from the plurality of pump valves 125 that is associated with the one or more modified hose 101. Each modified hose 101 used in the firefighting operation is connected to the communication interface 116 and the external power source 117 in order to enable the communication extension and safety lighting functions of the invention 100. Once firefighting operations are completed, the cleanup operation is supported by shutting down the pressure pump 121 and operating the vacuum pump 122. The vacuum pump 122 draws water through designated modified hoses 101 and pumps the drawn water to the designated water discharge point 127. A modified hose 101 is designated by opening the valve selected from the plurality of vacuum valves 126 that is associated with the modified hose 101. Water pumped by the vacuum pump 122 is routed to the final water discharge point using the storage discharge solenoid valve 128 and the environment discharge solenoid valve 129.

As shown in FIG. 4, a priming line 177 may be included. The priming line is located post the pressure pump 121 and the vacuum pump 122. The priming line 177 is in fluid connection between the pressure pump 121 and the vacuum pump 122.

The following definitions were used in this disclosure:

Check Valve: As used in this disclosure, a check valve is a valve that permits the flow of fluid or gas in a single direction.

LED: As used in this disclosure, an LED is an acronym for a light emitting diode. A light emitting diode is a 2 lead semiconductor that is also a light source.

Solenoid: As used in this disclosure, a solenoid is a cylindrical coil of electrical wire that generates a magnetic field that can be used to mechanically move a magnetic core.

Solenoid Valve: As used in this disclosure, a solenoid valve is an electromechanically controlled valve that is used to control fluid or gas flow. A two port solenoid valve opens or closes to fluid flow through the valve portion of the solenoid valve. A three port solenoid valve switched fluid or gas flow between a first port and a second port to either feed or be fed from a third port.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A fire protection system comprising:
   a modified hose, a pump system, and an electronics system;
   wherein the fire protection system is a fully duplex water management system;
   wherein the fire protection system adapted for use in firefighting;

wherein the fire protection system pumps water during firefighting operations;

wherein the fire protection system is reversible and can be used to remove water from the scene after firefighting operations have terminated;

wherein the fire protection system further comprises a communication extender for improving communication reliability in a hazardous situation;

wherein the fire protection system further comprises an emergency lighting capability for low light situations;

wherein the modified hose further comprises a hose, a nozzle, a connecting joint, a communication extender, a light net, a communication interface, and an external power source;

wherein the hose is a fire hose that is fitted with a nozzle and a connecting joint;

wherein the nozzle further comprises a nozzle valve;

wherein the communication extender is an electrical device that is used to improve radio communications within the area of the firefighting operations;

wherein the light net is a mesh that further comprises a plurality of LEDs;

wherein the pump system is designed to support one or more modified hoses;

wherein the pump system further comprises a pressure pump, a vacuum pump, and a plurality of valves;

wherein the pressure pumps water from a water reservoir through the modified hose;

wherein the vacuum pump removes water from the area of firefighting operations to a designated water discharge point;

wherein the plurality of valves further comprises a plurality of pump valves, a plurality of vacuum valves, a storage discharge solenoid valve and an environment discharge solenoid valve.

2. The fire protection system according to claim 1 wherein the communication extender is a plurality of wires.

3. The fire protection system according to claim 2 wherein the plurality of wires are connected to the area communication.

4. The fire protection system according to claim 1 wherein the communication extender is a two way radio repeater.

5. The fire protection system according to claim 4 wherein the light net is a mesh that further comprises a plurality of LEDs.

6. The fire protection system according to claim 5 wherein the pump system is designed to support one or more modified hoses.

7. The fire protection system according to claim 6 wherein the pump system further comprises a pressure pump, a vacuum pump, a plurality of valves.

8. The fire protection system according to claim 7 wherein the pressure pumps water from a water reservoir through the modified hose.

9. The fire protection system according to claim 8 wherein the vacuum pump removes water from the area of firefighting operations to a designated water discharge point; wherein the plurality of valves further comprises a plurality of pump valves, a plurality of vacuum valves, a storage discharge solenoid valve and an environment discharge solenoid valve.

10. The fire protection system according to claim 9 wherein a priming line is included, and is located post the pressure pump and the vacuum pump; wherein the priming line is in fluid connection between the pressure pump and the vacuum pump.

\* \* \* \* \*